(12) United States Patent
Minoguchi et al.

(10) Patent No.: US 8,985,008 B2
(45) Date of Patent: Mar. 24, 2015

(54) CYLINDER APPARATUS

(75) Inventors: Kazunori Minoguchi, Zama (JP); Tetsuo Yoshida, Kawasaki (JP); Hiroshi Yamagai, Yokohama (JP)

(73) Assignee: Hitachi Automotive Systems, Ltd., Ibaraki (JP)

( * ) Notice: Subject to any disclaimer, the term of this patent is extended or adjusted under 35 U.S.C. 154(b) by 1117 days.

(21) Appl. No.: 12/694,619

(22) Filed: Jan. 27, 2010

(65) Prior Publication Data
US 2010/0192766 A1 Aug. 5, 2010

(30) Foreign Application Priority Data

Jan. 30, 2009 (JP) .................................. 2009-020761
Jun. 30, 2009 (JP) .................................. 2009-156190

(51) Int. Cl.
*F16F 9/36* (2006.01)
*F16J 15/56* (2006.01)

(52) U.S. Cl.
CPC ... *F16J 15/56* (2013.01); *F16F 9/36* (2013.01)
USPC .......................................................... 92/168

(58) Field of Classification Search
CPC ....... F16F 9/3242; F16F 9/3257; F16F 9/362; F16F 9/364; F16F 9/365
USPC ...................................... 92/168; 188/322.17
See application file for complete search history.

(56) References Cited

U.S. PATENT DOCUMENTS

| 3,812,938 | A | * | 5/1974 | Fader et al. | 188/322.12 |
| 4,480,730 | A | * | 11/1984 | Koller et al. | 188/322.17 |
| 4,544,144 | A | * | 10/1985 | Ishida et al. | 188/322.17 |
| 5,115,892 | A | * | 5/1992 | Yamaoka et al. | 188/322.17 |
| 7,004,293 | B2 | * | 2/2006 | Schurmans | 188/322.17 |
| 7,458,314 | B2 | * | 12/2008 | Asa et al. | 92/168 |

FOREIGN PATENT DOCUMENTS

| JP | 59-101048 | 7/1984 |
| JP | 61-139326 | 8/1986 |
| JP | 5-64550 | 8/1993 |
| JP | 7-8659 | 2/1995 |
| JP | 2004-251413 | 9/2004 |
| JP | 2005-133902 | 5/2005 |

* cited by examiner

*Primary Examiner* — F. Daniel Lopez
(74) *Attorney, Agent, or Firm* — Wenderoth, Lind & Ponack, LLP (57) ABSTRACT

A piston connected with a piston rod is fitted in an outer tube having a hydraulic fluid sealed therein, with the piston rod projecting out of the outer tube. A seal part for the piston rod includes a rod guide, a seal case, an oil seal, a dust seal and a securing member, which are inserted into an end portion of the outer tube and secured by first and second staked portions. The sliding part of the piston rod is sealed with the rod seal and a seal lip of the oil seal. The area between the seal case and the outer tube is sealed with an O-ring and a seal member. The pressure resistance of the seal part can be increased to a considerable extent by two-point staking by the first and second staked portions and two-stage sealing by the rod seal and the oil seal.

20 Claims, 6 Drawing Sheets

CYLINDER APPARATUS

BACKGROUND OF THE INVENTION

The present invention relates to a cylinder apparatus for use in a suspension system of an automobile, for example.

Examples of cylinder apparatus include a tube-type hydraulic shock absorber attached to a suspension system of an automobile. In such a cylinder apparatus, the open end of a cylinder may be closed by using a closing structure as disclosed in Japanese Patent Application Publication No. 2004-251413. With this closing structure, after a seal case and an oil seal have been inserted into the cylinder, the open end of the cylinder is staked or caulked to prevent the extraction of the seal case and the oil seal from the cylinder. In a high-pressure cylinder apparatus as disclosed in Japanese Patent Application Publication No. 2005-133902, a cap is threaded onto the open end of the cylinder.

The closing structure in which a cap is threaded onto the open end of the cylinder is inferior in productivity. It is therefore desirable to use staking or caulking to close the open end of the cylinder. In cylinder apparatuses in which a high hydraulic pressure acts in a gas chamber, however, the staked or caulked portion is subjected to a great force. Therefore, it is desired that these cylinder apparatuses have further increased pressure resistance.

SUMMARY OF THE INVENTION

Accordingly, an object of the present invention is to provide a cylinder apparatus having increased pressure resistance at the open end of an outer tube constituting the cylinder apparatus.

To solve the above-described problem, the present invention provides a cylinder apparatus including an outer tube having a hydraulic fluid sealed therein, at least one end of which is open, a piston provided in the outer tube, a piston rod connected to the piston and projecting out of the outer tube, an annular seal case provided in the outer tube at a position closer to the one end, an outer peripheral seal that seals between the outer tube and the seal case, an annular rod seal provided at the inner periphery of the seal case in sliding contact with the piston rod, and an annular sliding seal provided at a side of the seal case that is closer to the one end. The sliding seal is in sliding contact with the piston rod.

The seal case is provided with an outer peripheral groove and secured to the outer tube by a first staked or caulked portion formed by staking or caulking the outer tube from outside into the outer peripheral groove. The sliding seal is secured to the outer tube by a second staked or caulked portion formed by staking or caulking the outer tube from outside.

DETAILED DESCRIPTION OF THE INVENTION

Embodiment of the present invention will be described below in detail with reference to the accompanying drawings. A cylinder apparatus 1 according to a first embodiment of the present invention will be explained with reference to FIGS. 1 and 3. The cylinder apparatus 1 according to this embodiment is installed in each of suspension systems for the front and rear left and right wheels of an automobile. The cylinder apparatuses 1 attached to the four wheels are connected to each other by a pipeline through an external hydraulic circuit, thereby allowing the cylinder apparatuses 1 to operate in association with each other. In addition, the flow of hydraulic fluid between the cylinder apparatuses 1 caused by changes in attitude of the vehicle body and so forth is controlled by an accumulator of the external hydraulic circuit and damping valves, thereby controlling the vibrations and attitude of the vehicle body.

Figure 1:
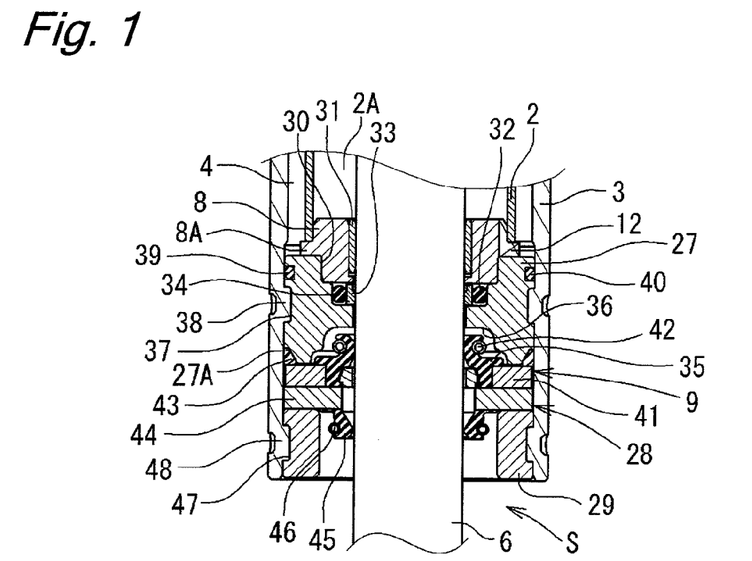
FIG. 1 is a fragmentary enlarged vertical sectional view showing a seal part for a piston rod that is a main part of a cylinder apparatus according to a first embodiment of the present invention.
Figure 3:
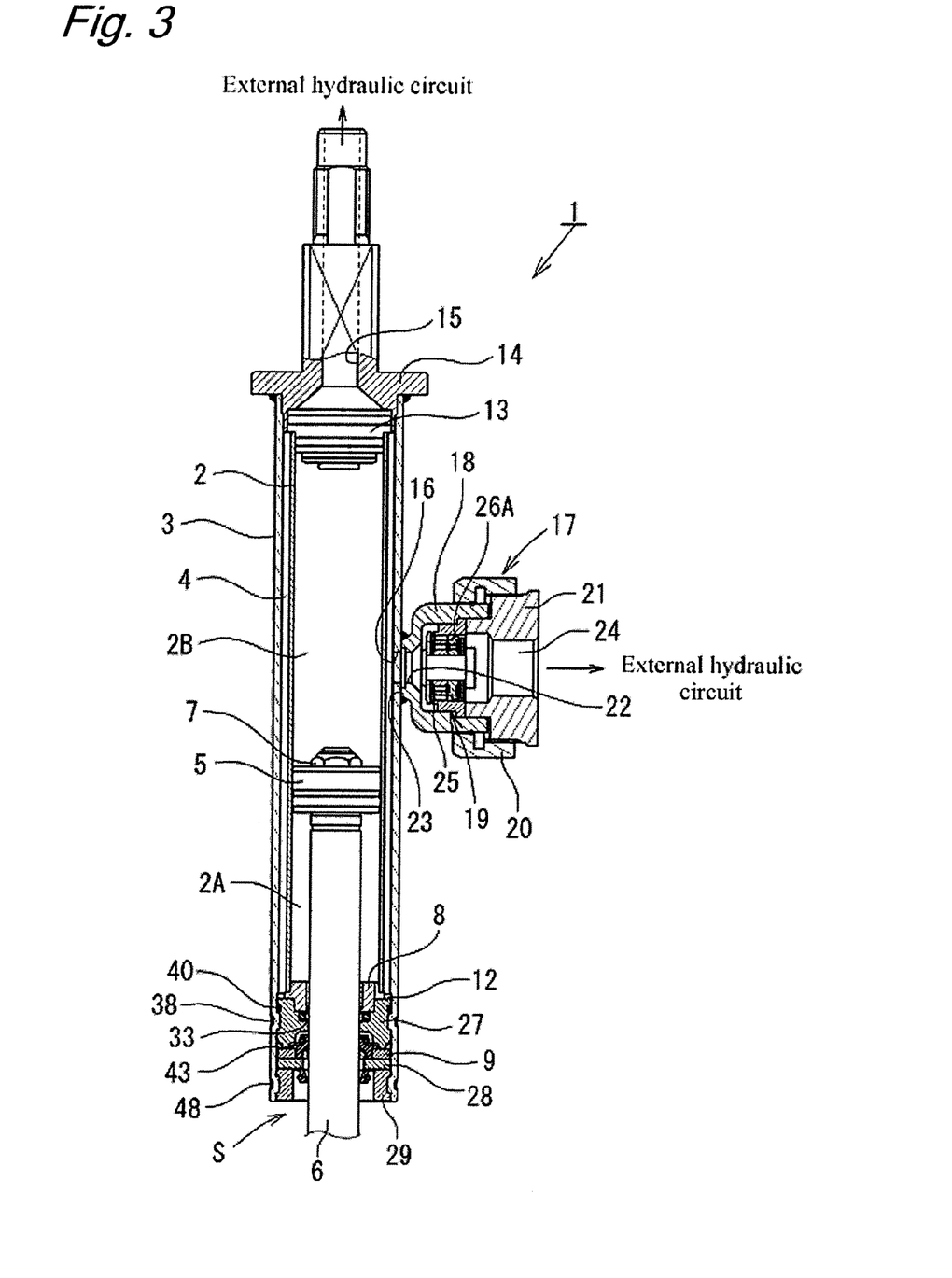
FIG. 3 is a vertical sectional view of the cylinder apparatus shown in FIG. 1.

As shown in FIGS. 1 and 3, the cylinder apparatus 1 has a double-tube structure comprising a cylinder 2 and a circular cylindrical outer tube 3 provided around the outer periphery of the cylinder 2 to form an annular passage 4 therebetween. A piston 5 is slidably fitted in the cylinder 2. The piston 5 divides the interior of the cylinder 2 into two chambers, i.e. cylinder chambers 2A and 2B. The piston 5 is connected with one end of a piston rod 6 by using a nut 7. The other end portion of the piston rod 6 extends slidably and fluid-tightly through a rod guide 8 and an oil seal 9 as a sliding seal, which are attached to the lower end of the double-tube structure comprising the cylinder 2 and the outer tube 3. The other end of the piston rod 6 projects to the outside of the cylinder apparatus 1. The cylinder chamber 2A and the annular passage 4 are communicated with each other through a cut portion 12 provided on the rod guide 8.

A damping valve 13 is attached to the upper end of the cylinder 2. The damping valve 13 is secured by a passage member 14 welded to the upper end of the outer tube 3. The passage member 14 has a connection port 15 axially extending therethrough. The cylinder chamber 2B is communicated with the connection port 15 through the damping valve 13. The upper end of the annular passage 4 is closed by the damping valve 13 and the passage member 14. The damping valve 13 is provided with a check valve that allows the flow of hydraulic fluid from the connection port 15 toward the cylinder chamber 2B, and further provided with a damping mechanism comprising an orifice, a disk valve, etc. that generate a damping force by controlling the flow of hydraulic fluid from the cylinder chamber 2B toward the connection port 15.

The outer tube 3 has an opening 16 provided in an intermediate part of the side wall thereof. The opening 16 is connected with a damping force generating mechanism 17. The damping force generating mechanism 17 includes a circular cylindrical valve casing 18 reduced in diameter at one end thereof, a damping valve 19 housed in the valve casing 18, and a connection member 21 secured to the large-diameter side open end of the valve casing 18 by using a nut 20.

The valve casing 18 has an annular joint portion 23 projecting around an opening portion 22 at the one end of the valve casing 18 reduced in diameter. The valve casing 18 is connected to the outer tube 3 by abutting the joint portion 23 against the outer peripheral surface of the outer tube 3 around the opening 16 and welding the joint portion 23 to the side wall of the outer tube 3.

The connection member 21 is provided with a connection port 24 communicating with the interior of the valve casing 18. The damping valve 19 is provided with a check valve 25 that allows only the flow of hydraulic fluid from the connection port 24 toward the opening portion 22, and further provided with a disk valve 26 with an orifice 26A that generates a damping force by controlling the flow of hydraulic fluid from the opening portion 22 toward the connection port 24.

Next, the structure of a seal part S for the piston rod 6, which is a main part of this embodiment, will be explained with reference mainly to FIG. 1.

As shown in FIG. 1, the outer tube 3 has an annular rod guide 8, a seal case 27, an oil seal 9, a dust seal 28 and a securing member 29, through which the piston rod 6 extends and which are inserted and secured in the lower end of the outer tube 3 in the mentioned order.

The rod guide 8 is fitted at one end thereof into the end of the cylinder 2. The rod guide 8 has a flange 8A formed on the outer periphery of an intermediate portion thereof. The flange 8A abuts against the end of the cylinder 2 to position the rod guide 8 in the axial direction. The other end of the rod guide 8 is fitted into a recess 30 formed in the seal case 27. The one end of the rod guide 8 and a part of the flange 8A are provided with a cut portion 12 that communicates between the cylinder chamber 2A and the annular passage 4. The rod guide 8 has a circular cylindrical low-friction member 31 press-fitted to the inner periphery thereof to slidably guide the piston rod 6 through the low-friction member 31. It should be noted that the low-friction member 31 is made of a metal, and the surface of the low-friction member 31 is coated with a fluorocarbon resin or the like to prevent the piston rod 6 from being damaged when the piston rod 6 slidingly contacts the surface of the low-friction member 31.

The seal case 27 has a recess 30 formed at one end thereof to be fitted with the rod guide 8. The bottom of the recess 30 is formed with a seal recess 32 having a smaller diameter than that of the recess 30. A seal groove is formed between the seal recess 32 and the end of the rod guide 8 press-fitted into the recess 30. The seal groove is fitted with a rod seal 33 and a backup ring 34 comprising an O-ring. The rod seal 33 seals between the seal case 27 and the piston rod 6. The other end of the seal case 27 is formed with a recess 36 that houses a seal lip 35 of the oil seal 9. It should be noted that the rod seal 33 is a resin material having self-lubricating properties and is in sliding contact with the piston rod 6 under tension at all times.

The seal case 27 has an outer peripheral groove 37 formed on an intermediate portion of the outer periphery thereof that is fitted to the outer tube 3. The seal case 27 is secured to the outer tube 3 by a first staked or caulked portion 38 formed by staking or caulking the outer tube 3 from the radially outer side into the outer peripheral groove 37. The seal case 27 has a seal groove 39 formed on the outer periphery thereof at a position closer to one end thereof (axially inward of the outer peripheral groove 37). The seal groove 39 is provided with an O-ring 40 serving as an outer peripheral seal to seal between the seal case 27 and the outer tube 3. The seal case 27 has a tapered seal surface 27A formed on the outer peripheral edge at the other end thereof. It should be noted that the seal case 27 and the rod guide 8 may be formed in an integral structure.

The oil seal 9 serving as a sliding seal has a disk-shaped reinforcing plate 41 and a seal lip 35, which is a lip-shaped seal member. The seal lip 35 is fixed to the inner side of the inner peripheral portion of the reinforcing plate 41. The inner peripheral portion of the seal lip 35 is in sliding contact with the piston rod 6. A tension spring 42 is fitted to the outer peripheral portion of the seal lip 35. A seal member 43 serving as an outer peripheral seal is fixed to one end of the outer peripheral portion of the reinforcing plate 41. The seal member 43 is pressed against the seal surface 27A of the seal case 27 by the reinforcing plate 41 to seal between the seal case 27 and the outer tube 3. The seal lip 35 and the seal member 43 are continuous with each other on the end surface of the reinforcing plate 41 to seal between the mutually abutting portions of the reinforcing plate 41 and the seal case 27.

The dust seal 28 has a disk-shaped reinforcing plate 44 and a dust lip 45, which is a lip-shaped seal member. The dust lip 45 is fixed to the outer side of the inner peripheral portion of the reinforcing plate 44. The inner peripheral portion of the dust lip 45 is in sliding contact with the piston rod 6. A tension spring 46 is fitted to the outer peripheral portion of the dust lip 45. It should be noted that the oil seal 9 and the dust seal 28 may be formed in an integral structure by sharing the reinforcing plates 41 and 44 with each other.

The securing member 29 has a groove 47 formed on its outer peripheral portion that is fitted to the outer tube 3. The securing member 29 is secured to the outer tube 3 by a second staked or caulked portion 48 which is formed by staking or caulking the outer tube 3 from the radially outer side into the outer peripheral groove 47. The securing member 29 secures the reinforcing plates 41 and 44 of the oil seal 9 and the dust seal 28 by pressing them toward the seal case 27. It should be noted that the first staked portion 38 and the second staked portion 48 may be different in configuration from each other, but if the first and second staked portions 38 and 48 have the same configuration, they can be formed by using the same staking tool. The first and second staked portions 38 and 48 need not be formed over the entire circumference of the outer tube 3 but may each be provided locally at four positions, for example, on the outer tube 3. In such a case, the first and second staked portions 38 and 48 should preferably be disposed at respective positions circumferentially displaced from each other. By so doing, the number of staked portions can be reduced without reducing the extraction load. Further, the first and second staked portions 38 and 48 are each formed by staking or caulking the outer tube 3 from the radially outer side into a groove provided on the associated member with a staking or caulking tool applied to the outer periphery of the outer tube 3. Therefore, the extraction load of the seal case 27 and the securing member 29 can be further increased.

The following is an explanation of the operation of this embodiment arranged as stated above.

The cylinder apparatus 1 has the passage member 14 and the piston rod 6 connected to sprung and unsprung members, respectively, of each wheel of an automobile, and an external hydraulic circuit constituting a suspension system is connected to each of the connection port 15 of the passage member 14 and the connection port 24 of the connection member 21.

During the extension stroke of the piston rod 6, the hydraulic fluid in the cylinder chamber 2A is pressurized by the sliding movement of the piston 5 in the cylinder 2 to flow toward the external hydraulic circuit through the cut portion 12, the annular passage 4, the opening 16, the opening portion 22, the orifice 26A and disk valve 26 of the damping valve 19 and the connection port 24. On the other hand, the cylinder chamber 2B is reduced in pressure by the sliding movement of the piston 5 in the cylinder 2. Consequently, the hydraulic fluid flows into the cylinder chamber 2B from the external hydraulic circuit connected to the connection port 15 of the passage member 14 through the check valve of the damping valve 13. Thus, a damping force is generated by the orifice 26A and disk valve 26 of the damping valve 19 against the stroke of the piston rod 6. In addition, a resisting force offered by the external hydraulic circuit acts against the stroke of the piston rod 6.

During the compression stroke of the piston rod 6, the hydraulic fluid in the cylinder chamber 2B is pressurized by the sliding movement of the piston 5 in the cylinder 2 to flow toward the external hydraulic circuit connected to the connection port 15 of the passage member 14 through the damping mechanism of the damping valve 13. On the other hand, the cylinder chamber 2A is reduced in pressure by the sliding movement of the piston 5 in the cylinder 2. Consequently, the hydraulic fluid flows into the cylinder chamber 2A from the external hydraulic circuit connected to the connection port 24 through the check valve 25 of the damping valve 19, the opening portion 22, the opening 16, the annular passage 4 and the cut portion 12. Thus, a damping force is generated by the damping mechanism of the damping valve 13 against the stroke of the piston rod 6. In addition, a resisting force offered by the external hydraulic circuit acts on the stroke of the piston rod 6.

Regarding the cylinder apparatuses 1 attached to the left and right wheels, for example, the respective connection ports 24 and 15 of the two cylinder apparatuses 1 may be connected to external hydraulic circuits having accumulators to connect together the cylinder chambers 2A and the cylinder chambers 2B, respectively. With this arrangement, the reaction force from the accumulators is small when the strokes of the cylinder apparatuses 1 attached to the left and right wheels are in the same direction (in-phase), and the reaction force is large when the strokes are in different directions (anti-phase). Accordingly, the system can effectively function as a stabilizer that suppresses changes in attitude of the vehicle body when the vehicle is turned.

During the above-described operation of the cylinder apparatus 1, the seal part S for the piston rod 6 is subjected to a very high pressure of the order of 35 MPa at maximum. The seal case 27 that receives the high pressure is firmly supported by the first and second staked portions 38 and 48 provided at two axially spaced positions, i.e. by the fitting between the outer peripheral groove 37 of the seal case 27 and the first staked portion 38 of the outer tube 3 and the fitting between the outer peripheral groove 47 of the securing member 29 and the second staked portion 48 of the outer tube 3. The piston rod 6 is sealed in two stages by the rod seal 33 and the seal lip 35 of the oil seal 9. Accordingly, the pressure acting on the seal lip 35, which is housed in the recess 36 of the seal case 27 to serve as a second-stage seal, is reduced to about 4 MPa by the rod seal 33 serving as a first-stage seal. Thus, the seal lip 35 is to seal the pressure reduced by the rod seal 33. Consequently, the pressure resistance of the seal part S for the piston rod 6 can be increased to a considerable extent. In comparison to the cylinder apparatus disclosed in the aforementioned related art literature, the cylinder apparatus of the present invention offers the following advantages. In the related art cylinder apparatus, the pressure in the cylinder acts on the entire surface of the rod guide at the cylinder end, whereas, in the cylinder apparatus of the present invention, the pressure acting on the inner peripheral side of the seal case 27 is reduced by the rod seal 33. Therefore, the pressure acting on the first staked portion 38 is the differential pressure between the pressure in the cylinder and the pressure reduced by the rod seal 33 serving as a first-stage seal. Supposing that the pressure in the cylinder is 35 MPa and the pressure reduced by the rod seal 33 is 31 MPa, for example, a force corresponding to 4 MPa acts on the first staked portion 38. Meanwhile, the pressure acting on the second staked portion 48 is mainly the pressure in the recess 36. Thus, the pressures acting on the first and second staked portions 38 and 48 are those reduced in two stages. Accordingly, it is possible to increase the durability against the extraction in the axial direction and the pressure resistance to the expansion in the radial direction.

It should be noted that the slidability and sealability between the seal lip 35 and the piston rod 6 are enhanced by the hydraulic fluid leaking through the rod seal 33 and accumulating in the recess 36. The dust lip 45 prevents the entry of contamination into the sliding area of the piston rod 6.

The area between the seal case 27 and the outer tube 3 is sealed by the first staked portion 38 and the O-ring 40 and the seal member 43, which are provided at the axially opposite sides of the first staked portion 38, thereby increasing the resistance to high pressures. In this regard, because the pressure in the cylinder acting on the first staked portion 38 is blocked by the O-ring 40, it is possible to suppress the swelling deformation of the first and second staked portions 38 and 48 by the hoop stress generated by the pressure in the cylinder, and hence possible to make the seal case 27 difficult to extract. In addition, staking or caulking the seal case 27, which is close to the end of the cylinder 2, can increase the deflection remaining in the cylinder 2 after the staking process. In other words, a high axial force remains in the cylinder 2, so that chattering of the cylinder 2 is unlikely to occur when a rebound force is input to the wheel. Accordingly, it is possible to suppress the generation of noise from the cylinder 2 during running of the vehicle.

Thus, the pressure resistance of the seal part S for the piston rod 6 can be increased to a considerable extent. It should be noted that the O-ring 40, which is one of the outer peripheral seals, may be omitted and only the seal member 43 may be used as an outer peripheral seal, provided that it is possible to obtain the required sealability and extraction resistance of the seal case 27 against the pressure in the cylinder. In this case, in the radial direction, the pressure from the annular passage 4 undesirably acts on the first staked portion 38; therefore, the pressure resistance in the radial direction cannot be much increased. However, the axial pressure acting on the first staked portion 38 is the differential pressure between the pressure in the recess 36 and the pressure in the annular passage 4 (supposing that the pressure in the recess 36 is 4 MPa and the pressure in the annular passage 4 is 35 MPa, for example, a pressure of 31 MPa acts on the first staked portion 38). The axial pressure acting on the second staked portion 48 is the pressure in the recess 36 and the pressure in the annular passage 4 corresponding to the area of the seal member 43. Therefore, the axial forces acting on the respective staked portions are reduced in comparison to the related art. Consequently, the extraction resistance of the staked portions increases, and the pressure resistance can be increased to a considerable extent.

Next, a second embodiment of the present invention will be described with reference to FIG. 2. In the following description, members or portions similar to those of the first embodiment shown in FIGS. 1 and 3 are denoted by the same reference signs as used in the first embodiment, and only portions in which the second embodiment differs from the first embodiment will be explained in detail.

Figure 2:
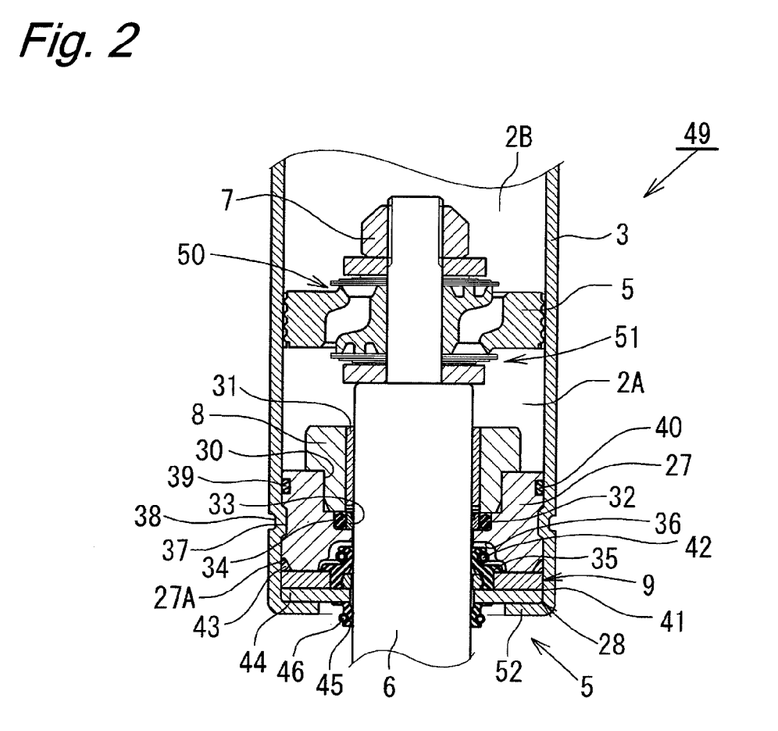
FIG. 2 is a fragmentary enlarged vertical sectional view showing a seal part for a piston rod that is a main part of a cylinder apparatus according to a second embodiment of the present invention.

As shown in FIG. 2, a cylinder apparatus 49 according to the second embodiment of the present invention is applied to a single-tube hydraulic shock absorber. In the cylinder apparatus 49, the outer tube 3 also serves as the cylinder 2, thereby omitting the cylinder 2, and the piston 5 is slidably fitted in the outer tube 3. Further, the damping valve 13 and the connection port 15 are omitted. The bottom of the outer tube 3 (cylinder) is closed, and a free piston (not shown) is fitted in the bottom of the outer tube 3 to form a gas chamber. The gas chamber is filled with a high-pressure gas.

Further, the damping force generating mechanism 17, which is provided on the side of the outer tube 3 in the first embodiment, is omitted, but instead the piston 5 is provided with extension and compression damping valves 50 and 51. The extension damping valve 50 generates a damping force by controlling the flow of hydraulic fluid from the cylinder chamber 2A toward the cylinder chamber 2B. The compression damping valve 51 generates a damping force by controlling the flow of hydraulic fluid from the cylinder chamber 2B toward the cylinder chamber 2A.

The rod guide 8 is secured by being press-fitted into the recess 30 of the seal case 27. The securing member 29 is omitted. The reinforcing plate 44 of the dust seal 28 is secured by a staged or caulked portion 52 formed by staking or caulking the end portion of the outer tube 3 inward over the entire circumference thereof. It should be noted that the staked portion 52 may be provided by partial staking or caulking of the end portion of the outer tube 3 at about four circumferentially spaced positions.

With the above-described structure, the cylinder apparatus 49, which is a single-tube hydraulic shock absorber, operates as follows. During the extension stroke of the piston rod 6, the hydraulic fluid in the cylinder chamber 2A is pressurized by the sliding movement of the piston 5 in the outer tube 3 (cylinder) to flow toward the cylinder chamber 2B through the extension damping valve 50. Thus, a damping force is generated by the extension damping valve 50. During the compression stroke of the piston rod 6, the hydraulic fluid in the cylinder chamber 2B is pressurized to flow toward the cylinder chamber 2A through the compression damping valve 51. Thus, a damping force is generated by the compression damping valve 51. During the extension and compression strokes, a volumetric change in the outer tube 3 (cylinder) due to the extension and contraction of the piston rod 6 is compensated for by the compression and expansion of the high-pressure gas in the gas chamber. The seal part S for the piston rod 6 has greatly increased pressure resistance to the pressure in the outer tube 3 (cylinder) as in the foregoing first embodiment.

Although in the foregoing first and second embodiments the present invention is applied to a cylinder apparatus installed in an automotive suspension system to generate a damping force, by way of example, it should be noted that the present invention is not limited thereto but may also be applied to any other cylinder apparatus having a seal part for a piston rod.

Although in the foregoing embodiments the oil seal 9 and the dust seal 28 are shown to be discrete components, by way of example, it is possible to use a generally known seal in which oil and dust seals are integrated together.

A third embodiment of the present invention will be explained below in detail with reference to FIGS. 4 to 7. Unlike the first and second embodiments, the third embodiment is a cylinder apparatus having no damping force generating mechanism. The cylinder apparatus according to the third embodiment controls the projecting position of a rod by supplying or discharging a fluid into or from cylinder upper and lower chambers. This type of cylinder apparatus may be provided, for example, in a part of an automobile where a stabilizer is installed, to change the rigidity of the stabilizer, and may also be used in general applications to control the relative position between two objects.

Figure 4:
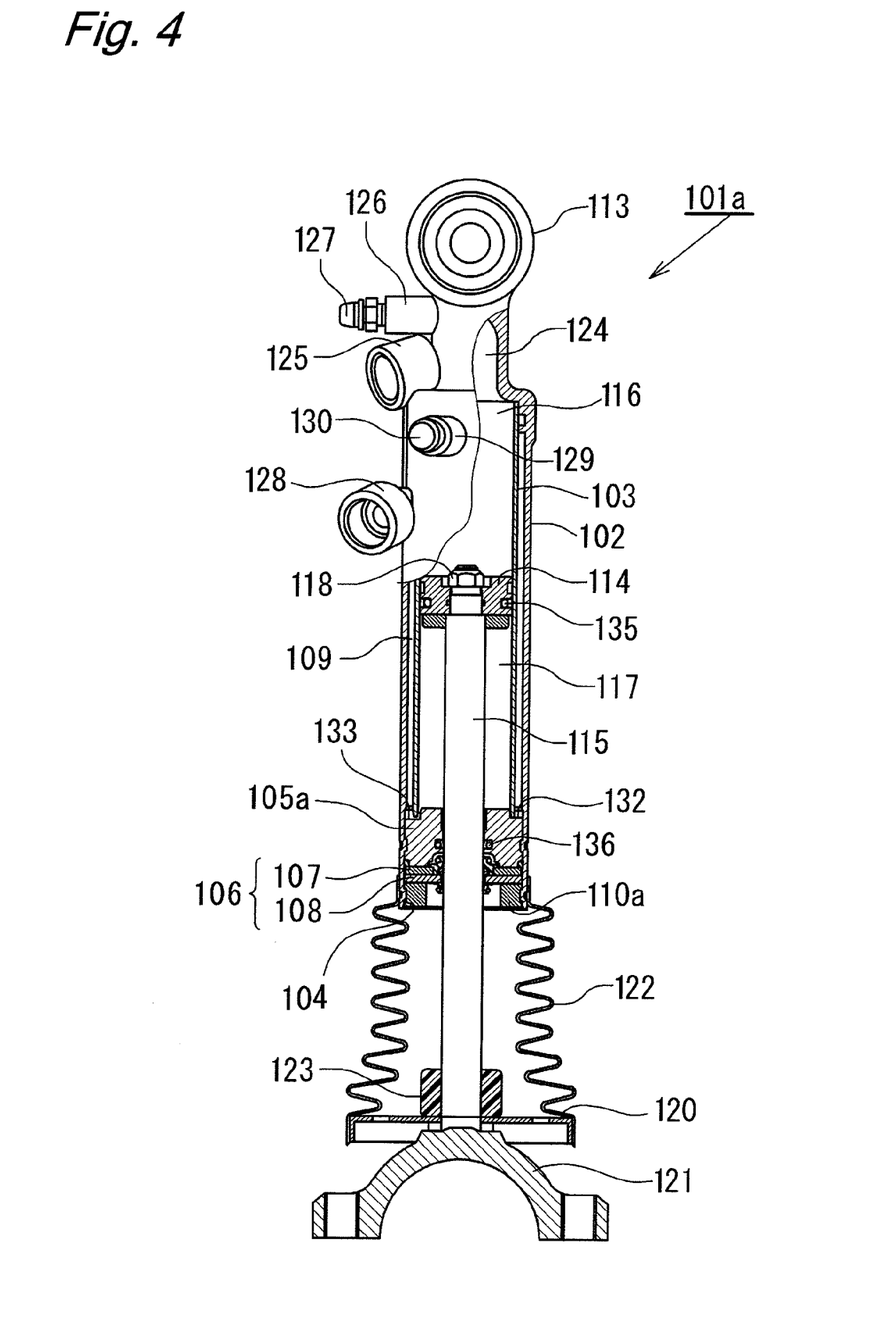
FIG. 4 is a partly sectioned view of a cylinder apparatus according to a third embodiment of the present invention.

The cylinder apparatus according to the third embodiment of the present invention is provided as a hydraulic cylinder apparatus 101a in which hydraulic oil is employed as a hydraulic fluid. It should be noted that the following explanation will be made on the assumption that the open end side of an outer tube 102 is the lower side, and the bottom side of the outer tube 102 is the upper side, as shown in the figures.

Figure 5:
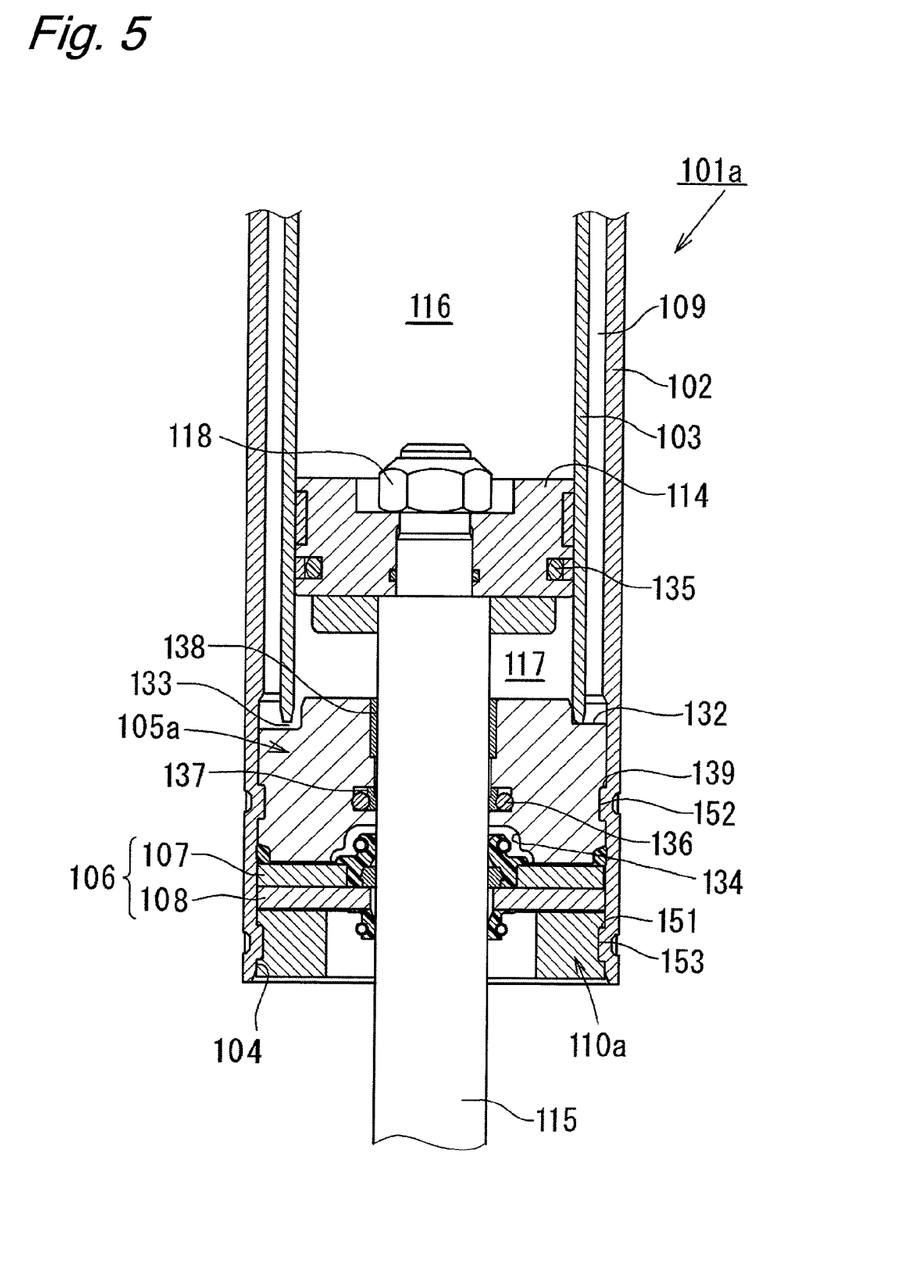
FIG. 5 is a fragmentary enlarged view of a main part of the cylinder apparatus according to the third embodiment of the present invention.

The hydraulic cylinder apparatus 101a according to the third embodiment has, as shown in FIGS. 4 and 5, a double-tube structure in which a circular cylindrical outer tube 102, one end of which is closed, is disposed around the outer periphery of a circular cylindrical inner tube 103. The outer tube 102 has an opening portion 104 at the lower end thereof. An annular communicating passage 109 is formed between the outer tube 102 and the inner tube 103. In the double-tube structure, a rod guide 105a, a seal member 106 and a securing member 110a are fitted at the lower end of the inner tube 103 and in the opening portion 104 at the lower end of the outer tube 102 in such a manner as to abut against the inner peripheral surface of the outer tube 102. The rod guide 105a, the seal member 106 and the securing member 110a are disposed in the mentioned order from the upper side, i.e. from the bottom side of the inner tube 103, in such a manner as to abut against each other. It should be noted that a mounting eye 113 is integrally provided at the upper end of the outer tube 102.

As shown in FIG. 4, a piston 114 is slidably fitted in the inner tube 103. The piston 114 divides the interior of the inner tube 103 to define two chambers, i.e. a first cylinder chamber 116 and a second cylinder chamber 117. The piston 114 is connected with the upper end of a piston rod 115 by using a nut 118. It should be noted that the piston 114 has an annular groove provided on the outer peripheral surface of the bottom thereof. The annular groove is fitted with a seal mechanism 135 comprising a clamping ring (O-ring) provided at the inner peripheral side of the annular groove and a resin seal ring at the outer peripheral side of the groove. The lower end portion of the piston rod 115 extends through the rod guide 105a, the seal member 106 and the securing member 110a and projects to the outside of the outer tube 102. The projecting lower end of the piston rod 115 extends through a cover mount 120 and is connected to a fixture 121 having a semicircular sectional configuration. Further, a stretchable cover 122 is disposed to cover the end portion of the piston rod 115 that projects out of the outer tube 102. The stretchable cover 122 is connected at its upper end to the outer peripheral surface of the lower end of the outer tube 102 and at its lower end to the outer periphery of the cover mount 120. It should be noted that a bump rubber 123 abutting against the cover mount 120 is fitted onto the lower end of the piston rod 115.

As shown in FIG. 4, a chamber 124 is formed in the upper end portion of the outer tube 102. The chamber 124 is in direct communication with the first cylinder chamber 116. The upper end of the chamber 124 has a substantially hemispherical configuration in which the diameter gradually decreases upward. The side wall of the chamber 124 is formed with a first supply-discharge port 125 communicating with the interior of the chamber 124 and also formed with a first bleeding hole 126 communicating with the uppermost portion of the chamber 124 above the first supply-discharge port 125. It should be noted that the first bleeding hole 126 is equipped with a first bleeding plug 127. Further, the side wall of the top of the outer tube 102 is formed with a second supply-discharge port 128 communicating with the communicating passage 109 and also formed with a second bleeding hole 129 communicating with the uppermost portion of the communicating passage 109 above the second supply-discharge port 128. It should be noted that the second bleeding hole 129 is equipped with a second bleeding plug 130.

The rod guide 105a is, as shown in FIG. 5, formed in a circular cylindrical shape through which the piston rod 115 extends. The rod guide 105a has an annular stepped portion 132 formed on the outer peripheral edge of the upper end thereof. The annular stepped portion 132 has an L-shaped sectional configuration to be fitted with the lower end of the inner tube 103. A passage 133 is formed between the annular stepped portion 132 and the lower end of the inner tube 103 to provide communication between the communicating passage 109 and the second cylinder chamber 117. A cylindrical member 138 is fitted to the inner peripheral surface of the top of the rod guide 105a. The rod guide 105a has a recess 134 formed substantially in the center of the lower end surface thereof to house a part of an oil seal 107 constituting the seal member 106. The rod guide 105a further has an annular groove provided on the inner peripheral surface thereof. The annular groove is fitted with a backup ring 136 comprising an O-ring. A seal ring 137 is provided inside the backup ring 136. Further, the rod guide 105a has an annular recess 139 formed on the outer peripheral surface thereof at the same position as the backup ring 136 in the axial direction. The annular recess 139 has an open sided rectangle-shaped sectional configuration to receive and secure a staked or caulked portion.

The oil seal 107 as a sliding seal, which constitutes the seal member 106, is disposed such that a membranous portion 141 (see FIG. 6) of the oil seal 107 abuts against the lower end surface of the rod guide 105a.

It should be noted that, although in the third embodiment an annular recess 139 is formed on the outer peripheral surface of the rod guide 105a to receive and secure a staked or caulked portion, the annular recess 139 may be replaced by a plurality of circumferentially spaced groove portions. The annular recess 139 may be formed with a U-shaped sectional configuration or a V-shaped sectional configuration. Further, there may be provided a plurality of axially spaced annular recesses 139.

Figure 6:
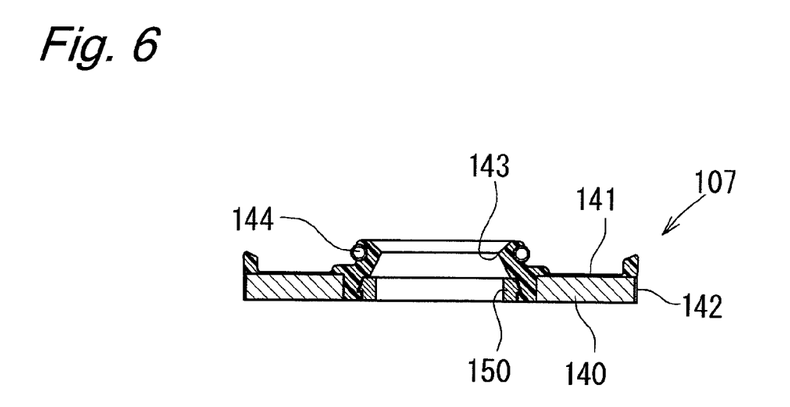
FIG. 6 is an enlarged view of an oil seal employed in the cylinder apparatus according to the third embodiment of the present invention.
Figure 7:
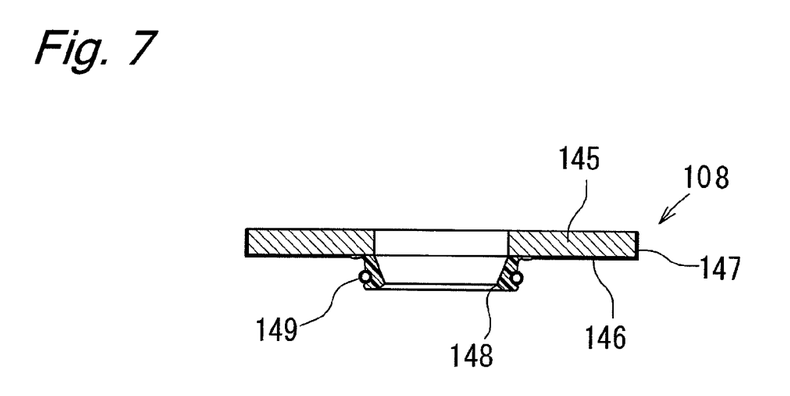
FIG. 7 is an enlarged view of a dust seal employed in the cylinder apparatus according to the third embodiment of the present invention.

The seal member 106 comprises, as shown in FIGS. 5, 6 and 7, an oil seal 107 and a dust seal 108 through which the piston rod 115 extends and which are in pressure contact with the outer peripheral surface of the piston rod 115. The oil seal 107 abuts against the lower end surface of the rod guide 105a, and the dust seal 108 abuts against the lower end surface of the oil seal 107. The oil seal 107 has an annular washer 140 contacting the inner wall of the opening portion 104 and a synthetic resin baked to the inner periphery of the washer 140. The dust seal 108 has an annular washer 145 contacting the inner wall of the opening portion 104 and a synthetic resin baked to the inner periphery of the washer 145.

The oil seal 107 further has a seal part. The seal part of the oil seal 107 is integrally formed from a membranous portion 141 and an outer peripheral seal portion 142 that seals between the outer peripheral surface of the washer 140 and the inner peripheral surface of the outer tube 102. Further, the oil seal 107 has a seal lip 143 projecting inward from the inner peripheral surface of the top thereof to press against the outer peripheral surface of the piston rod 115. A support ring 150 is provided on the inner peripheral surface of the bottom of the oil seal 107. It should be noted that a backup ring 144 is provided on the outer periphery of the part of the oil seal 107 where the seal lip 143 is formed, to suppress the expansion of the seal lip 143.

The dust seal 108 further has a seal part. The seal part of the dust seal 108 is integrally formed from a membranous portion 146 and an outer peripheral seal portion 147 that seals between the outer peripheral surface of the washer 145 and the inner peripheral surface of the outer tube 102. Further, the dust seal 108 has a seal lip 148 projecting inward from the inner peripheral surface of the bottom thereof to press against the outer peripheral surface of the piston rod 115. It should be noted that a backup ring 149 is provided on the outer periphery of the part of the dust seal 108 where the seal lip 148 is formed, to suppress the expansion of the seal lip 148.

The securing member 110a abuts against the lower end surface of the dust seal 108, i.e. the membranous portion 146 of the dust seal 108.

As shown in FIG. 5, the securing member 110a is formed in a circular cylindrical shape. The thickness of the securing member 110a is set to substantially a half of the thickness of the rod guide 105a and to substantially 3 times the thickness of the washer 140 of the oil seal 107 or the thickness of the washer 145 of the dust seal 108. The outer diameter of the securing member 110a coincides with the inner diameter of the outer tube 102. The inner diameter of the securing member 110a is somewhat larger than the inner diameter of the washer 140 of the oil seal 107. The securing member 110a has an annular recess 151 formed on a substantially axially middle portion of the outer peripheral surface thereof. The annular recess 151 has an open sided rectangle-shaped sectional configuration to receive and secure a staked or caulked portion.

It should be noted that, although in the third embodiment an annular recess 151 is formed on the outer peripheral surface of the securing member 110a to receive and secure a staked or caulked portion, the annular recess 151 may be replaced by a plurality of circumferentially spaced groove portions. The annular recess 151 may be formed with a U-shaped sectional configuration or a V-shaped sectional configuration. Further, there may be provided a plurality of axially spaced annular recesses 151.

The oil seal 107, the dust seal 108 and the securing member 110a are similar to the oil seal 9, the dust seal 28 and the securing member 29, respectively, of the first embodiment.

To construct the hydraulic cylinder apparatus 101a according to the third embodiment, as shown in FIG. 4, the rod guide 105a, the oil seal 107, the dust seal 108 and the securing member 110a are fitted onto the piston rod 115, and the upper end of the piston rod 115 is secured to the piston 114 by using the nut 118, thereby forming a rod assembly. Subsequently, the rod assembly is inserted into the inner tube 103.

Subsequently, the rod assembly, together with the inner tube 103, is inserted into the outer tube 102. Thereafter, the inner tube 103 is pressed axially from the upper side, with the lower end surface of the securing member 110a used as a retaining surface, to eliminate backlash to prevent chattering of the inner tube 103.

Thereafter, with the above-described state maintained, the outer periphery of the outer tube 102 is, as shown in FIG. 5, pressed at a position corresponding to the annular recess 139 provided on the rod guide 105a from the outside with a staking or caulking tool (not shown), thereby inwardly projecting this part of the peripheral wall of the outer tube 102 to form a projection 152 engaged with the annular recess 139 of the rod guide 105a. In this way, the rod guide 105a is secured to the outer tube 102 by staking or caulking. Further, the outer periphery of the outer tube 102 is pressed at a position corresponding to the annular recess 151 provided on the securing member 110a from the outside with a staking or caulking tool (not shown), thereby inwardly projecting this part of the peripheral wall of the outer tube 102 to form a projection 153 engaged with the annular recess 151 of the securing member 110a, and thus securing the securing member 110a to the outer tube 102 by staking or caulking to complete the hydraulic cylinder apparatus 101a.

The following is an explanation of the operation of the hydraulic cylinder apparatus 101a according to the third embodiment.

A hydraulic oil supply-discharge system (not shown) is connected to the first and second supply-discharge ports 125 and 128. To extend the piston rod 115, hydraulic fluid is supplied into the first cylinder chamber 116 from the first supply-discharge port 125 through the chamber 124, and at the same time, hydraulic fluid in the second cylinder chamber 117 is discharged from the second supply-discharge port 128 through the passage 133 and the communicating passage 109.

To contract the piston rod 115, hydraulic fluid is supplied into the second cylinder chamber 117 from the second supply-discharge port 128 through the communicating passage 109 and the passage 133, and at the same time, hydraulic fluid in the first cylinder chamber 116 is discharged from the first supply-discharge port 125 through the chamber 124. It should be noted that the piston rod 115 is locked in position by closing the first and second supply-discharge ports 125 and 128.

When hydraulic fluid is to be filled into the first and second cylinder chambers 116 and 117, air bleeding is performed by opening the first and second bleeding plugs 127 and 130. In regard to the air bleeding, the first bleeding hole 126 is connected to the uppermost portion of the chamber 124, and the second bleeding hole 129 is connected to the uppermost portion of the communicating passage 109. Therefore, air bleeding can be performed efficiently by mounting the hydraulic cylinder apparatus 101a to an object to be equipped with it, with the mounting eye 113 facing upward.

Figure 8:
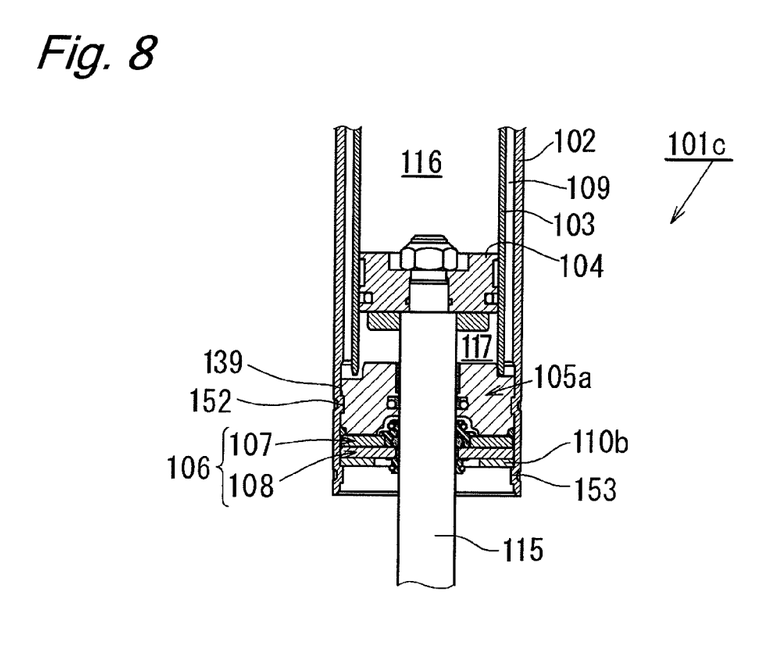
FIG. 8 is a fragmentary enlarged view of a main part of a cylinder apparatus according to a fourth embodiment of the present invention.

Next, a hydraulic cylinder apparatus 101c as a cylinder apparatus according to a fourth embodiment of the present invention will be explained with reference to FIG. 8.

The following explanation will be made of only the points in which the hydraulic cylinder apparatus 101c according to the fourth embodiment differs from the hydraulic cylinder apparatus 101a according to the third embodiment.

In the hydraulic cylinder apparatus 101c, the thickness of the securing member 110b substantially coincides with the thickness of the washer 140 of the oil seal 107 or the thickness of the washer 145 of the dust seal 108.

To construct the hydraulic cylinder apparatus 101c according to the fourth embodiment, the rod guide 105a, the oil seal 107, the dust seal 108 and the securing member 110b are fitted onto the piston rod 115, and the upper end of the piston rod 115 is secured to the piston 114 by using the nut 118, thereby forming a rod assembly. After the rod assembly, together with the inner tube 103, has been inserted into the outer tube 102, the lower end surface of the securing member 110b is abutted on a retaining jig (not shown) splittable into two parts installed in the opening portion 104 of the outer tube 102, and the inner tube 103 is pressed axially from the upper side.

Thereafter, with the above-described state maintained, the outer periphery of the outer tube 102 is pressed at a position corresponding to the annular recess 139 provided on the rod guide 105a from the outside with a staking or caulking tool (not shown), thereby inwardly projecting this part of the peripheral wall of the outer tube 102 to form a projection 152 engaged with the annular recess 139 of the rod guide 105a. Thus, the rod guide 105a is secured to the outer tube 102 by staking or caulking. Further, the outer periphery of the outer tube 102 is pressed at a position somewhat below the lower end surface of the securing member 110b (i.e. below the end surface of the securing member 110b at a side thereof closer to the open end of the outer tube 102) from the outside with a staking or caulking tool (not shown), thereby inwardly projecting this part of the peripheral wall of the outer tube 102 to form a projection 153 engaged with the lower end surface of the securing member 110b, and thus securing the securing member 110b to the outer tube 102 by staking or caulking. Finally, the retaining jig is drawn out of the opening portion 104 of the outer tube 102 and split into two parts before being removed from the hydraulic cylinder apparatus 101c. The fourth embodiment can provide a pressure resistance substantially equal to that obtained with the third embodiment but is inferior in terms of assembling efficiency to the third embodiment in which the hydraulic cylinder apparatus 101a also has the function of a retaining jig.

In the foregoing hydraulic cylinder apparatuses 101a and 101c according to the third and fourth embodiments of the present invention, the opening portion 104 of the outer tube 102 is closed by securing the securing member 110a (110b) to the outer tube 102 by staking or caulking. Therefore, as compared to the conventional technique of closing the opening portion 104 by threading an internally threaded cap onto the outer periphery of the outer tube 102, the hydraulic cylinder apparatuses 101a and 101c according to the third and fourth embodiments do not need the internally threading process in machining of components and hence are capable of suppressing the mixing of very fine chips or the like into the outer tube 102. Moreover, the hydraulic cylinder apparatuses 101a and 101c can dispense with troublesome operations such as tightening-torque control and therefore offer increased operation efficiency.

Thus, of the hydraulic cylinder apparatuses 101a and 101c according to the third and fourth embodiments, the hydraulic cylinder apparatus 101a of the third embodiment is preferable from the viewpoint of the pressure resistance and assembling efficiency. The hydraulic cylinder apparatus 101c according to the fourth embodiment can be employed for applications in which the deformation of the outer tube 102 by the cylinder pressure is small.

Although in the foregoing embodiments the cylinder apparatus according to the present invention is applied to oil hydraulic cylinders, the present invention may also be applied to water hydraulic cylinders and air cylinders.

The cylinder apparatuses of the foregoing embodiments can increase the pressure resistance at the open end of the outer tube.

Although only some exemplary embodiments of this invention have been described in detail above, those skilled in the art will readily appreciate that many modifications are possible in the exemplary embodiments without materially departing from the novel teaching and advantages of this invention. Accordingly, all such modifications are intended to be included within the scope of this invention.

The present application claims priority under 35 U.S.C. section 119 to Japanese Patent Applications No. 2009-020761 filed on Jan. 30, 2009 and No. 2009-156190 filed on Jun. 30, 2009.

The entire disclosure of Japanese Patent Applications No. 2009-020761 filed on Jan. 30, 2009 and No. 2009-156190 filed on Jun. 30, 2009 including specification, claims, drawings and summary is incorporated herein by reference in their entirety.

What is claimed is:

1. A cylinder apparatus comprising:
   an outer tube including a chamber which has a hydraulic fluid sealed therein, the outer tube having a first end and a second end that is spaced from the first end in the axial direction of the outer tube, the first end being open;

a piston provided in the chamber of the outer tube;

a piston rod connected to the piston and projecting out of the outer tube through the first end of the outer tube;

an annular seal case provided in the outer tube at a position closer to the first end, the seal case having an inner peripheral portion and an outer peripheral portion;

a first outer peripheral seal disposed between the outer tube and the outer peripheral portion of the seal case, the first outer peripheral seal sealing between the outer tube and the seal case;

a second outer peripheral seal disposed between the outer tube and the outer peripheral portion of the seal case, the second outer peripheral seal sealing between the outer tube and the seal case;

an annular rod seal provided at the inner peripheral portion of the seal case in sliding contact with the piston rod; and an annular oil seal provided at a side of the seal case that is closer to the first end, the annular oil seal being in sliding contact with the piston rod;

the piston rod sealed in two stages by the rod seal and the oil seal, the outer peripheral portion of the seal case being provided with an outer peripheral groove and secured to the outer tube by a first staked portion formed by staking the outer tube from outside into the outer peripheral groove in a radial direction of the outer tube; and wherein the outer peripheral portion of the seal case receives at a side thereof closer to the chamber a pressure which is the same as a pressure applied to the rod seal, the outer peripheral portion of the seal case receives at an opposite side thereof spaced apart from the chamber a pressure between the rod seal and the oil seal which is reduced by the rod seal, the first outer peripheral seal is disposed at a first side of the first staked portion closer to the first end of the outer tube, the second outer peripheral seal is disposed at an axially opposite second side of the first staked portion closer to the second end of the outer tube, the first outer peripheral seal and the second outer peripheral seal are spaced apart from the first staked portion in the axial direction of the piston rod, the first outer peripheral seal is arranged to prevent the pressure between the rod seal and the oil seal, which is reduced by the rod seal, from being applied between the first staked portion of the outer tube and the outer peripheral portion of the seal case, and the second outer peripheral seal is arranged to prevent the pressure, which is the same as the pressure applied to the rod seal, from being applied between the first staked portion of the outer tube and the outer peripheral portion of the seal case.

2. The cylinder apparatus of claim 1, wherein the annular oil seal is secured by fitting an annular securing member in the outer tube axially outward of the annular oil seal and securing the securing member to the outer tube by a second staked portion formed by staking the outer tube from outside.

3. The cylinder apparatus of claim 2, wherein the securing member has a groove provided on an outer periphery thereof, the second staked portion being staked into the groove in a radial direction of the outer tube.

4. The cylinder apparatus of claim 3, wherein the first staked portion and the second staked portion have a same configuration.

5. The cylinder apparatus of claim 1, which is a single-tube hydraulic shock absorber wherein the piston comprises damping valves, and the piston is slidably inserted into the outer tube.

6. The cylinder apparatus of claim 1, which has a double-tube structure in which the outer tube is provided outside a cylinder having the piston slidably fitted therein.

7. The cylinder apparatus of claim 6, wherein the chamber of the outer tube is divided by the piston into a first chamber in which the piston rod is not disposed and a second chamber in which the piston rod is disposed, an annular passage is formed between the cylinder and the outer tube, the second chamber is in communication with the annular passage at a position closer to the first end of the outer tube through a passage without through the rod seal.

8. The cylinder apparatus of claim 7, wherein the first chamber is connected to an external hydraulic circuit through a first damping valve and a first connection port, and the first damping valve is arranged to control the flow of hydraulic fluid between the first connection port and the first chamber to generate a damping force.

9. The cylinder apparatus of claim 7, wherein a damping force generating mechanism is provided on a side wall of the outer tube, the damping force generating mechanism is connected to an external hydraulic circuit through a second connection port, the cylinder apparatus further comprises a second damping valve arranged to control the flow of hydraulic fluid between the second connection port and the annular passage to generate a damping force.

10. The cylinder apparatus of claim 7, further comprises:

a first supply-discharge port communicating with the first chamber and being connected to a hydraulic fluid supply-discharge system, and a second supply-discharge port communicating with the second chamber and being connected to the hydraulic fluid supply-discharge system.

11. A cylinder apparatus comprising:

a cylinder including a cylinder chamber which has a hydraulic fluid sealed therein, an outer tube disposed around the cylinder, the outer tube having an annular passage defined between the outer tube and the cylinder, the outer tube having a first end and a second end that is spaced from the first end in the axial direction of the outer tube, the first end being open;

a piston provided in the cylinder chamber and dividing an interior of the cylinder into a first cylinder chamber and a second cylinder chamber;

a piston rod connected to the piston and projecting out of the outer tube through the second cylinder chamber and the first end of the outer tube;

a passage communicating between the second cylinder chamber and the annular passage at a position closer to the first end;

an annular seal case provided in the outer tube at a position closer to the first end, the seal case having an inner peripheral portion and an outer peripheral portion;

a first outer peripheral seal disposed between the outer tube and the outer peripheral portion of the seal case, the first outer peripheral seal sealing between the outer tube and the seal case;

a second outer peripheral seal disposed between the outer tube and the outer peripheral portion of the seal case, the second outer peripheral seal sealing between the outer tube and the seal case;

an annular rod seal provided at the inner peripheral portion of the seal case in sliding contact with the piston rod; and an annular oil seal provided at a side of the seal case that is closer to the first end, the annular oil seal being in sliding contact with the piston rod;

the piston rod sealed in two stages by the rod seal and the oil seal, the outer peripheral portion of the seal case being provided with an outer peripheral groove and secured to the outer tube by a first staked portion formed by staking the outer tube from outside into the outer peripheral groove in a radial direction of the outer tube; and wherein the outer peripheral portion of the seal case receives at a side thereof closer to the chamber a pressure in the annular passage which is the same as a pressure in the second cylinder chamber, the outer peripheral portion of the seal case receives at an opposite side thereof spaced apart from the chamber a pressure which is reduced by the rod seal, the first outer peripheral seal is disposed at a first side of the first staked portion closer to the first end of the outer tube, the second outer peripheral seal is disposed at an axially opposite second side of the first staked portion closer to the second end of the outer tube, the first outer peripheral seal and the second outer peripheral seal are spaced apart from the first staked portion in the axial direction of the piston rod, the first outer peripheral seal is arranged to prevent the reduced pressure from being applied between the first staked portion of the outer tube and the outer peripheral portion of the seal case, and the second outer peripheral seal is arranged to prevent a pressure in the annular passage which is the same as a pressure in the second cylinder chamber from being applied between the first staked portion of the outer tube and the outer peripheral portion of the seal case.

12. The cylinder apparatus of claim 11, wherein the annular oil seal is secured by fitting an annular securing member in the outer tube axially outward of the annular oil seal and securing the securing member to the outer tube by a second staked portion formed by staking the outer tube from outside.

13. The cylinder apparatus of claim 12, wherein the securing member has a groove provided on an outer periphery thereof, the second staked portion being staked into the groove in a radial direction of the outer tube.

14. The cylinder apparatus of claim 13, wherein the first staked portion and the second staked portion have a same configuration.

15. The cylinder apparatus of claim 11, wherein
the first cylinder chamber is connected to an external hydraulic circuit through a first damping valve and a first connection port, and
the first damping valve is arranged to control the flow of hydraulic fluid between the first connection port and the first cylinder chamber to generate a damping force.

16. The cylinder apparatus of claim 11, wherein
a damping force generating mechanism is provided on a side wall of the outer tube,
the damping force generating mechanism is connected to an external hydraulic circuit through a second connection port, the cylinder apparatus further comprises a second damping valve arranged to control the flow of hydraulic fluid between the second connection port and the annular passage to generate a damping force.

17. The cylinder apparatus of claim 11, further comprises:
a first supply-discharge port communicating with the first cylinder chamber and being connected to a hydraulic fluid supply-discharge system, and
a second supply-discharge port communicating with the second cylinder chamber and being connected to the hydraulic fluid supply-discharge system.

18. A cylinder apparatus comprising:
a cylinder including a cylinder chamber which has a hydraulic fluid sealed therein,
an outer tube disposed around the cylinder, the outer tube having an annular passage defined between the outer tube and the cylinder, the outer tube having a first end and a second end that is spaced from the first end in the axial direction of the outer tube, the first end being open;
a piston provided in the cylinder chamber and dividing an interior of the cylinder into a first cylinder chamber and a second cylinder chamber;
a piston rod connected to the piston and projecting out of the outer tube through the second cylinder chamber and the first end of the outer tube;
a passage communicating between the second cylinder chamber and the annular passage at a position closer to the first end;
an annular seal case provided in the outer tube at a position closer to the first end, the seal case having an inner peripheral portion and an outer peripheral portion;
an annular rod seal provided at the inner peripheral portion of the seal case in sliding contact with the piston rod; and
an annular oil seal provided at a side of the seal case that is closer to the first end, the annular oil seal being in sliding contact with the piston rod;
the piston rod sealed in two stages by the rod seal and the oil seal,
the outer peripheral portion of the seal case being provided with the outer peripheral groove and secured to the outer tube by a first staked portion formed by staking the outer tube from outside into the outer peripheral groove in a radial direction of the outer tube; and
wherein the outer peripheral portion of the seal case receives at a side thereof closer to the chamber a pressure in the annular passage which is the same as a pressure in the second cylinder chamber,
the outer peripheral portion of the seal case receives at an opposite side thereof spaced apart from the chamber a pressure which is reduced by the rod seal,
the oil seal comprises a disk-shaped reinforcing plate and a seal lip, the seal lip being fixed to the inner side of the inner peripheral portion of the reinforcing plate, the seal lip being in sliding contact with the piston rod,
the cylinder apparatus comprises
a first seal disposed between the reinforcing plate and the seal case to seal between the reinforcing plate and the seal case,
a second seal disposed between the outer tube and the outer peripheral portion of the seal case to seal between the outer tube and the seal case,
the second seal being disposed at a position which is closer to the second end of the outer tube and which is axially spaced apart from the first staked portion, the first seal arranged to prevent the reduced pressure from being applied between the first staked portion of the outer tube and the outer peripheral portion of the seal case, and the second seal arranged to prevent a pressure in the annular passage which is the same as a pressure in the second cylinder chamber from being applied between the first staked portion of the outer tube and the outer peripheral portion of the seal case.

19. The cylinder apparatus of claim 18, wherein the annular oil seal is secured by fitting an annular securing member in the outer tube axially outward of the annular oil seal and securing the securing member to the outer tube by a second staked portion formed by staking the outer tube from outside.

20. The cylinder apparatus of claim 19, wherein the securing member has a groove provided on an outer periphery thereof, the second staked portion being staked into the groove in a radial direction of the outer tube.

* * * * *